United States Patent [19]
Patino et al.

[11] Patent Number: 5,471,128
[45] Date of Patent: Nov. 28, 1995

[54] BATTERY AND METHOD FOR CHARGING/DISCHARGING THE BATTERY

[75] Inventors: Joseph Patino, Plantation; Henry A. Bogut, Coral Springs; James L. Tidwell, Fort Lauderdale, all of Fla.

[73] Assignee: Motorola, Inc., Schaumburg, Ill.

[21] Appl. No.: 157,499

[22] Filed: Nov. 26, 1993

[51] Int. Cl.[6] .................................. H01M 10/44
[52] U.S. Cl. .................................. 320/13; 320/14
[58] Field of Search ................. 320/15, 14, 21, 320/13, 35

[56] References Cited

U.S. PATENT DOCUMENTS

| | | | |
|---|---|---|---|
| 5,194,059 | 2/1993 | Patino et al. | 320/15 |
| 5,198,743 | 3/1993 | McClure et al. | 320/31 |
| 5,307,000 | 4/1994 | Podrazhansky et al. | 320/14 |
| 5,349,281 | 9/1994 | Bugai | 320/14 |
| 5,363,030 | 11/1994 | Ford et al. | 320/13 |
| 5,363,031 | 11/1994 | Miller et al. | 320/21 |

*Primary Examiner*—Steven L. Stephan
*Assistant Examiner*—Nicholas Ponomarenko
*Attorney, Agent, or Firm*—Barbara R. Doutre

[57] ABSTRACT

A battery charging system (200) includes a field-effect transistor (212) as a current discharge protection device in order to prevent current from flowing from battery (222) to charger (202) when charger (202) is not charging or discharging battery (222). The field-effect transistor (212) also protects battery (222) in the case that the battery contacts are inadvertently shorted. When charger (202) is charging battery (222), field-effect transistor (212) is turned on, providing for reduced voltage drop across the device due to its low on resistance, and also allows for charger (202) to charge and discharge (condition) battery (222).

11 Claims, 4 Drawing Sheets

BATTERY AND METHOD FOR CHARGING/DISCHARGING THE BATTERY

TECHNICAL FIELD

This invention relates generally to batteries and more specifically to a battery and method for charging and discharging the battery.

BACKGROUND

It is very common for rechargeable battery assemblies (battery packs) which are used in portable communication devices, such as two-way radios, to include a reverse current protection diode. This reverse current protection diode is used to prevent current from flowing out of the B+ terminal if the battery is put into a charger and the charger is turned off. Battery protection diodes are particularly important in flammable environments since they prevent sparking in case of an inadvertent short on the battery's charger side B+ and B− contacts.

Referring to FIG. 1, there is shown a prior art battery charging scheme consisting of a charger 102, radio battery 106 and radio 104. Radio 104 contains positive (B+) and negative (B−) battery terminals which are coupled to radio battery 106 via battery contacts 116 and 114, respectively. Battery 106 contains one or more battery cells 108, which determine the voltage and current capacity of battery 106. Also included as part of the battery 106, is a reverse current protection diode (D1) 118, a battery temperature indicator such as thermistor (Rt) 112 and a battery capacity indicator, such as resistor (Rc) 110.

Charger 102 consists of a charger monitor circuit 128, which can consist of a well known microprocessor or microcontroller as known in the art and appropriate control software. Charger monitor circuit 128 controls charger control circuit 130 which provides current to battery 106 in order to charge the battery. Charger control circuit 130 is implemented using a well known programmable current source circuit. A control signal is transmitted by charger monitor circuit 128 to charger control circuit 130 via bus 140, the control signal informs charger control circuit 130 on how much current to source via line 129 to battery 106.

Charger monitor circuit 128 contains three analog to voltage on the B+ line. A/D port 122 senses the resistance of capacity resistor Rc 110 and A/D port 124 in turn senses the resistance of thermistor Rt 112, as its resistance changes once the battery begins charging. A/D ports 122 and 124 include external pull-up resistors which are used to determine the resistance of Rc 110 and Rt 112, by determining the voltage level at A/D ports 122 and 124, respectively.

A major problem with the battery and battery charging scheme shown in FIG. I is that protection diode 118 experiences a 0.71 volt drop if it is a silicon diode and a 0.52 volt drop if it is a Schottky diode when for example, two amperes of current are flowing from battery charger 102 to radio 104 or battery 106. The power dissipation for the silicon diode would be approximately 1.42 watts and for the Schottky diode would be 1.04 watts. These high power dissipation levels causes battery 106 to heat up excessively. This causes thermistor 112 not to measure the true temperature rise of battery cells 108. Which in turn causes charger 128 not to provide proper charging currents to be applied to battery 106. Since the heat rise in battery 106 is not only caused by battery cells 108, but by protection diode 118, a proper determination of when battery cells 108 become exothermic in order to shut off rapid charge currents to battery 106 can also not be accurately determined.

Another problem caused by protection diode 118 is that ultra fast charging levels (e.g., charging at a charge current equal to five times the capacity of battery 108, or other high charge currents) can not be used to charge battery cells 108 quickly given the enormous amount of power dissipation that would occur by the voltage drop of diode 118.

A final problem with the prior art battery charging and sensing scheme shown in FIG. I is that because of the reverse protection diode, the battery is not allowed to be discharged from the battery's charger side B+ contact for battery conditioning purposes. Thus, a need exists for a battery and method for charging a battery which can solve the above mentioned problems.

DETAILED DESCRIPTION OF THE PREFERRED EMBODIMENT

Figure 1:
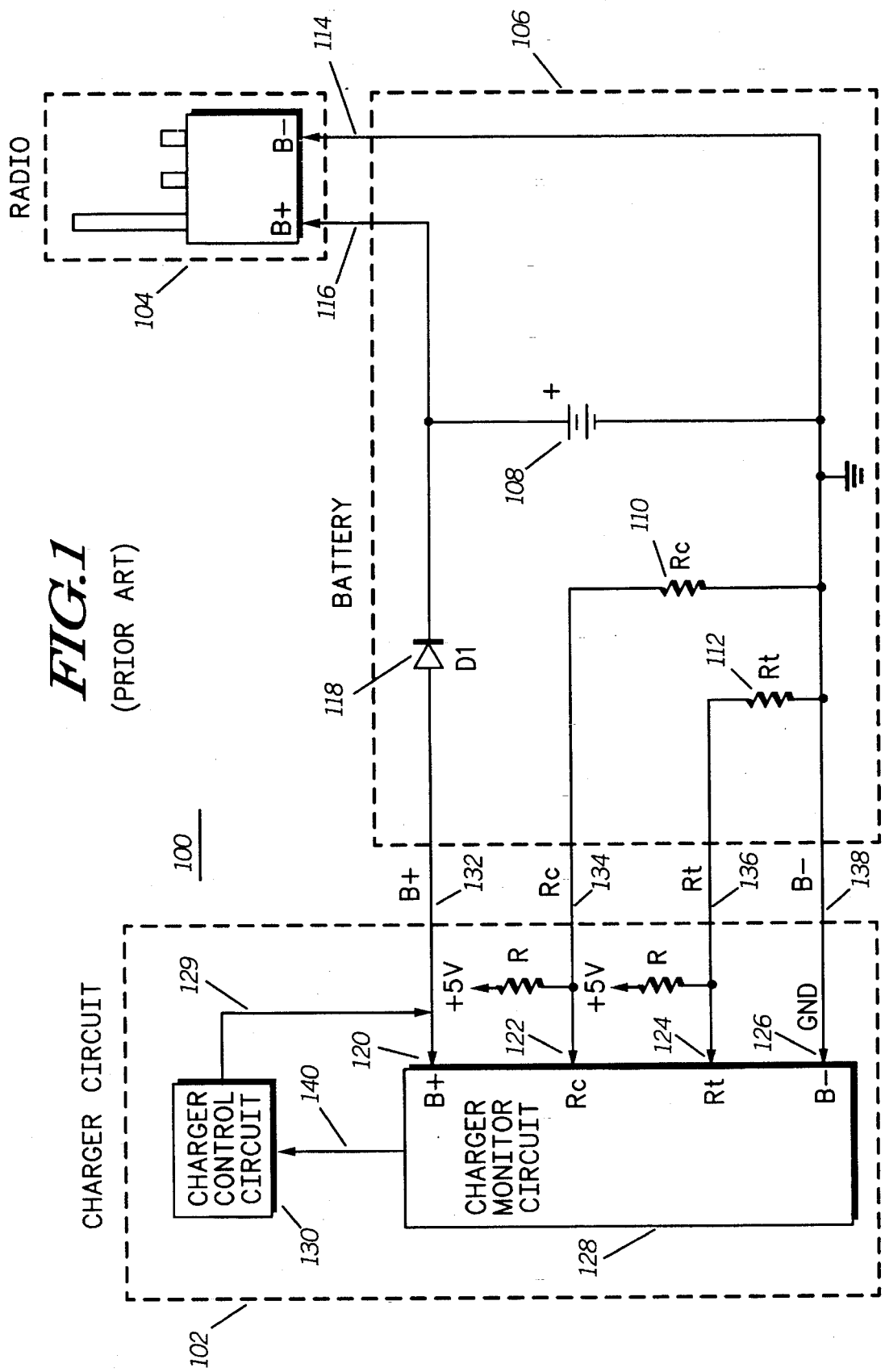
FIG. 1 is a schematic of a prior art battery charging system.

While the specification concludes with claims defining the features of the invention that are regarded as novel, it is believed that the invention will be better understood from a consideration of the following description in conjunction with the drawing figures.

Figure 2:
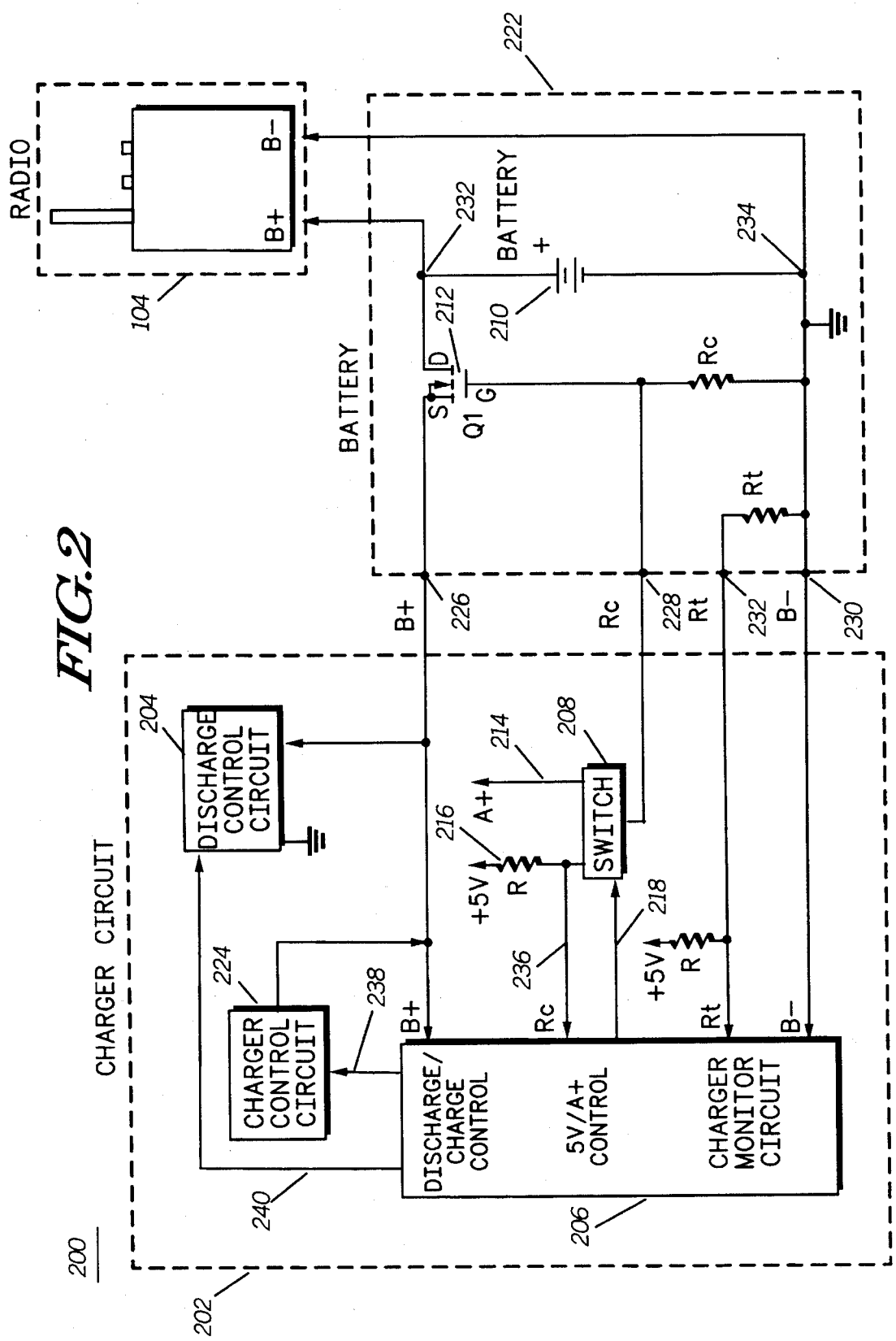
FIG. 2 is a battery charging system in accordance with the present invention.

Referring now to the drawings and in particular to FIG. 2, there is shown a battery charging system 200 in accordance with the present invention. Charging system 200 includes a battery charger 202, battery pack 222 and battery powered device 104. The present invention utilizes a switchable means such as a field-effect transistor (FET) 212. FET 212 can be a FET such as a TMOS FET, like those manufactured by Motorola, Inc. Operationally, FET 212 is biased from the existing Rc line which is coupled to the gate terminal of FET 212. FET 212 provides the same reverse discharge protection that diode 118 offers.

Battery pack 222 preferably includes a battery housing (not shown) which environmentally encloses battery cells 210, FET 212, the capacity resistor Rc and thermistor Rt. Battery pack 222 also includes first 226, second 228, third 230 and fourth 232 battery pack contacts. These contacts are preferably located on the battery pack housing and interface with matching contacts found on charger circuit 202. FET 212 provides for an open circuit (electrical decoupling) between battery cells 210 and B+ contact 226 when the FET is in a first operational state or turned off. Battery cells 210 have a first or positive battery terminal 232 and a second or negative battery terminal 234. Battery cells 210 can be any type of rechargeable battery cells such as nickel cadmium, nickel hydride, etc. When a predetermined voltage level is applied at line 220, FET 212 is switched on or into its second operational state, allowing for current to flow between battery contact 226 and battery terminal 232. In the preferred embodiment, FET 212 will only be turned on when battery pack 222 is coupled to charger 202, and charger 202 is turned on. Hence, if charger 202 is turned off, FET 212 will not be biased and the battery cells 210 will be disconnected from the battery's B+ terminal. Also, when battery pack 222 is removed from charger 202, the FET is turned off, and the B+ terminal is open circuited. Battery charger 202 can determine that a battery is coupled to it by charger monitor circuit 206 monitoring to see if it can measure a voltage developed from capacity resistor (Rc) at the monitor circuit's Rc port 236.

Present N-channel FETs are capable of ON resistance's of 0.035 ohms at 2 Amps, while P-channel FETs are capable of ON resistance's of 0.1 ohms at 2 Amps. Hence, the power being dissipated by FETs is reduced substantially and accordingly, the heat being generated due to the voltage drop of the FETs is also reduced substantially. Since it is a known fact that battery cell life is directly effected by temperature, the reduction of heat by using the FET in place of the diode maximizes the battery's capacity and battery's cycle life.

According to the invention, charger circuit 202 uses a switch 208 to select between 5 volts pulled up through resistor 216 and between A+ voltage 214. The A+ voltage has to be greater than the voltage of battery 210 at first battery terminal 232, in the present invention, A+ voltage is set equal to 12 volts, which is greater than the 7.5 volt level at first battery terminal 232. These voltages are switched onto line 220 under the control of charger monitor circuit 206 via switch control line 218. When switch 208 has the 5 volt level selected, monitor circuit 206 can monitor the Rc value because Rc and R 216 form a voltage divider into monitor circuit port 236.

Charger monitor circuit 206 determines the Rc value by selecting the 5 volt supply with pull up resistor (216) via line 218 and reading the voltage developed on input line Rc. Charger 202 then knows the battery type to be charged (e.g., capacity of battery pack 222). To begin charging, charger monitor circuit 206 disables the discharge control circuit 204 and enables the charge control circuit 224 via control lines 238 and 240. This is done by monitor circuit 206 sending out appropriate signals to charge control circuit 224 and discharge control circuit 204 via output lines 238 and 240. Simultaneously, the switch control line 218 sends a signal such as a predetermined voltage level to switch circuit 208 in order to select the A+ supply 214.

The selected A+ voltage level is sent to the gate terminal of FET 212 via line 228 which biases FET 212 on. Once FET 212 is in the on condition, current can flow from battery contact 226 and battery terminal 232, which allows for the charging or discharging of battery cells 210. The A+ voltage level is necessary because the voltage at the gate of FET 212 is required to be greater than the battery voltage in order to turn on FET 212. A+ is generally 12 volts minimum, although it could be lower if the battery cells to be charged are of a low voltage level. Once FET 212 is biased on, the ON resistance for the N-channel FET is 0.035 ohms, so at 2 Amps, the voltage drop through FET 212 is reduced to 0.07 V which produces a total power dissipation of only 140 mW.

To discharge battery 222 for conditioning purposes, the charger monitor circuit 206 having FET already biased on, as described above, needs only to disable the charge control circuit 224 and enable the discharge control circuit 204. In this fashion, the current now flows out of battery 210 and into the discharge control circuit 204. Discharge control circuit 204 can be implemented using a well known current sink circuit, such as by using a transistor which sends B+ contact 226 to ground potential via a resistor in order to discharge current from battery cells 210.

Figure 3:
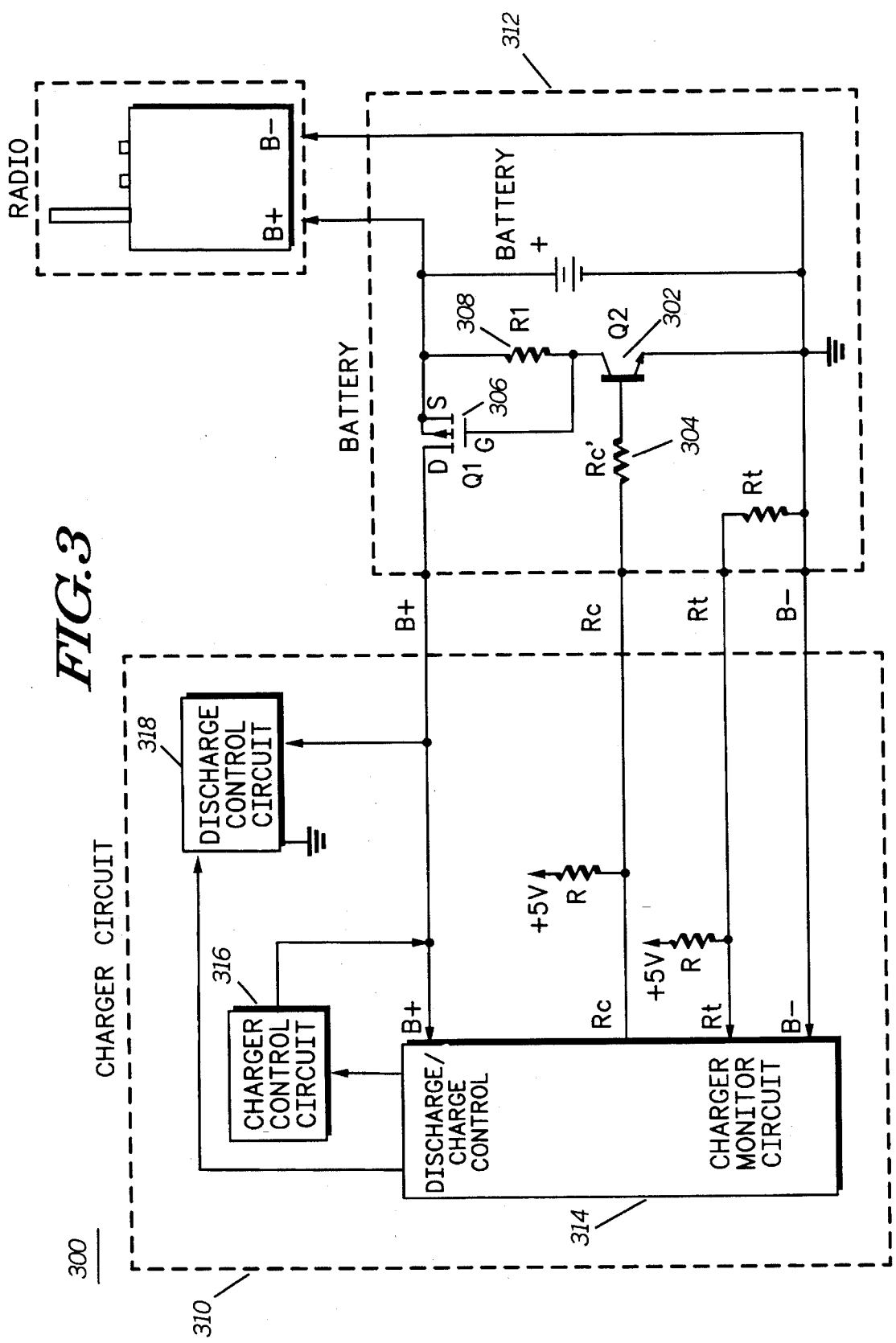
FIG. 3 is a second embodiment of the battery system in accordance with the invention.

An alternate approach to the circuit shown in FIG. 2 is using a P-channel FET approach as shown in FIG. 3. The P-channel FET ON resistance is approximately 0.1 ohms, so at 2 Amps the voltage drop is reduced to 0.2 V for a total of 0.40 W dissipation. Although the voltage drop is not reduced by as much as the N-channel FET, this approach still offers a significant reduction in voltage drop and power dissipation as compared to the schottky diode (1.0 W dissipation) and the silicon diode (1.4 W dissipation) of the prior art.

One of the unique features of this configuration is the use of Rc' (capacity resistor) 304 to act as both the capacity resistor for battery pack 312, and is also to used to turn on NPN transistor 302. Rc' resistor 304 found in battery pack 312 will need to be selected such that the corresponding voltage read by charger 310 is compensated by charger 310 for the additional diode drop across NPN transistor 302 in order to properly read the value of capacity resistor Rc' 304 and in turn be able to properly identify battery 312.

Resistor 308 causes the gate and source voltages to be equal on P-channel FET 306 when transistor 302 is not biased on via Rc' 304. In this state, FET 306 is turned off and current can not flow in or out of battery pack 312. When NPN transistor 302 is biased on via Rc' 304, the voltage at the gate of FET 306 is reduced such that FET 306 is now turned on. In this state, charger monitor circuit 314 can select the charge control circuit 316 or discharge control circuit 318 to either charge or discharge battery pack 312. As was the case with the circuit shown in FIG. 2, if charger circuit 310 is turned off, the base of the NPN transistor 302 will not be biased and hence, the gate and source terminals of FET 306 will again be at the same voltage potential because of resistor 308, causing FET 306 to turn off.

Figure 4:
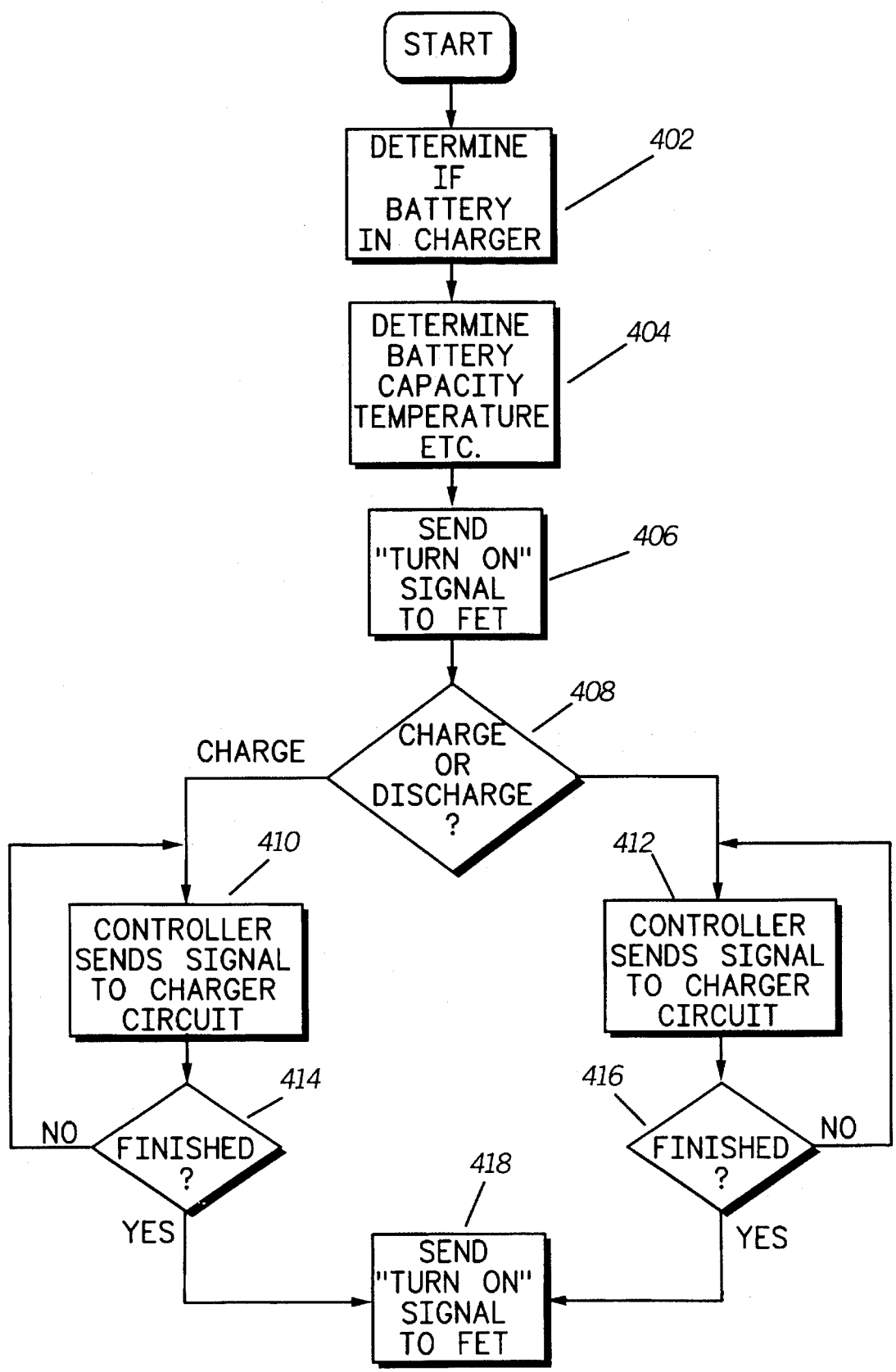
FIG. 4 is a flowchart showing a typical charge/discharge sequence in accordance with the invention.

In FIG. 4 a flowchart showing a typical charge/discharge sequence in accordance with the present invention is shown. The steps in FIG. 4 will be related to the charger shown in FIG. 2, although those skilled in the art will realize that the charger shown in FIG. 3 could also implement the same steps which are to be discussed. In step 402, charger 202 determines if battery 222 is coupled to the charger. If a battery is coupled to the charger in step 404, battery charger 202 determines the capacity of the battery by sensing the value of capacity resistor Rc. After the capacity of battery and the other battery information is determined in step 404, charger monitor circuit (controller) 206 in step 406 sends a "turn on" signal via line 218 to battery 222. This signal is received via line 220 as the A+ voltage level which causes FET 12 to turn on.

In step 408, it is determined by monitor circuit 206 whether the battery is to be charged or discharged. If the battery is to be charged, monitor circuit 206 in step 410 sends an appropriate signal to charge control circuit 224 to start charging battery 222. If in step 408 it was determined that battery 222 was going to be discharged, in step 412, monitor circuit 206 sends an appropriate signal to discharge circuit 204 instead. Monitor circuit 206 determines how long either the charge or discharge sequences will be based on internal control software and the monitor circuits monitoring of the condition of battery 222 (e.g., monitoring the temperature of battery 222 using thermistor Rt, etc.).

In steps 414 and 416 it is determined whether the charge sequence of step 410 or the discharge sequence of step 412 are completed. If charger 202 determines that the charge/discharge sequences are completed, monitor circuit 206 sends a "turn off" signal to battery 222. In this particular example, the "turn off" signal takes the form of the gate terminal of FET 212 being placed at 5 volts which shuts off the FET due to the fact that the voltage at the drain terminal is higher due to the voltage of battery cells 210.

The present invention provides for several improvements over the prior art use of blocking diodes. The present invention allows for both charge and discharge capabilities, which in turn allows the battery charger to condition the battery. The reduction in heat provided by the invention increases battery performance and cycle life. The reduced heat provided by the present circuit also means that the monitoring of the battery temperature can be done more accurately, thereby providing for more accurate charging of the battery. The reduced voltage drop found in the present battery also allows for higher charge current capabilities, thereby allowing for quicker charging of the battery.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack, comprising:

reverse discharge protection circuitry;

a battery pack contact;

a battery cell having a battery terminal; and a switchable means coupled between the battery terminal and the battery pack contact, the switchable means switching between a first state allowing for current to flow between the battery terminal and the battery pack contact and a second state in which current is not allowed to flow between the battery pack contact and the battery terminal.

2. A battery pack as defined in claim 1, wherein the switchable means comprises a field-effect transistor (FET).

3. A battery pack as defined in claim 2, wherein the battery cell comprises a rechargeable battery cell.

4. A battery pack as defined in claim 2, wherein the FET includes source, drain and gate terminals, and the source terminal is coupled to the battery pack contact, the drain terminal is coupled to the battery terminal, and the gate terminal is coupled to a second battery pack contact.

5. A battery pack as defined in claim 4, further comprising:

a third battery pack contact; and a resistor coupled between the second and third battery pack contacts.

6. A battery charging system, comprising:

a battery pack, comprising:

reverse discharge protection circuitry, a battery pack contact;

a battery cell having a battery terminal; and a field-effect transistor (FET) coupled between the battery terminal and the battery pack contact, the switchable means switching between a first state allowing for current to flow between the battery terminal and the battery pack contact and a second state in which current is not allowed to flow between the battery pack contact and the battery terminal; and a battery charger coupled to the battery pack, the battery charger comprising:

a controller; and the controller providing a control signal to the FET in order to switch it between the first and second states.

7. A battery charging system as defined in claim 6, wherein the battery charger further comprises:

a voltage switching circuit responsive to the controller for providing a first voltage level to the FET in order to place the FET in the first state and providing a second voltage level to the FET in order to place the FET in the second state.

8. A battery charging system as define in claim 6, wherein the battery charger further comprises:

a charging circuit;

a discharging circuit; and the controller selectably couples either the charging circuit or the discharging circuit to the battery pack contact.

9. A method for charging or discharging a battery pack using a battery charger, the battery pack having a field-effect transistor (FET), first and second battery contacts and a battery having a battery terminal, comprising the steps of:

(a) providing reverse discharge protection circuitry within the battery pack;

(b) coupling the battery pack to the battery charger;

(c) receiving a control signal at the second battery contact;

(d) switching the FET to a first state in response to the control signal, the FET in the first state electrically interconnects the battery terminal to the battery charger; and (e) commencing to charge or discharge the battery pack using the battery charger.

10. A method as defined in claim 9, comprising the further step of:

(f) switching the FET to a second state so that the battery terminal is electrically disconnected from the battery charger.

11. A method as defined in claim 10, wherein step (d) comprises providing a first voltage level to the FET and step (f) comprises providing a second voltage level to the FET.

* * * * *